United States Patent [19]

Bordener

[11] Patent Number: 5,628,949
[45] Date of Patent: May 13, 1997

[54] MOLD PROCESS FOR PRODUCING A FINISHED SOLID SURFACE COUNTERTOP

[76] Inventor: Robert Bordener, 2888 Colonial Way, Bloomfield Hills, Mich. 48304

[21] Appl. No.: 416,133

[22] Filed: Apr. 4, 1995

[51] Int. Cl.⁶ .......................... B29C 41/08; B29C 71/02
[52] U.S. Cl. .................. 264/161; 264/219; 264/254; 264/255; 264/309; 264/213; 264/236
[58] Field of Search .......................... 264/74, 130, 131, 264/132, 250, 255, 259, 161–162, 245, 246, 247, 264, 265, 134, 135, 254, 301, 306, 308, 309, 213, 219, 220, 224, 236, 347

[56] References Cited

U.S. PATENT DOCUMENTS

| | | | |
|---|---|---|---|
| 3,079,644 | 3/1963 | Molitor et al. | 264/245 |
| 3,193,598 | 7/1965 | Schafer . | |
| 3,219,735 | 11/1965 | Iverson et al. | 264/74 |
| 3,325,574 | 6/1967 | Stadden | 264/74 |
| 3,350,483 | 10/1967 | Erb et al. | 264/74 |
| 3,378,612 | 4/1968 | Dietz . | |
| 3,488,246 | 1/1970 | Duggins . | |
| 3,492,391 | 1/1970 | Van Atten | 264/254 |
| 3,773,886 | 11/1973 | Starr et al. | 264/254 |
| 3,914,485 | 10/1975 | Curtis . | |
| 3,941,636 | 3/1976 | Drout et al. | 264/254 |
| 3,947,178 | 3/1976 | Belshaw et al. . | |
| 4,016,235 | 4/1977 | Ferro | 264/254 |
| 4,104,353 | 8/1978 | Monnet | 264/255 |
| 4,155,969 | 5/1979 | Hendry | 264/45.1 |
| 4,473,516 | 9/1984 | Hunerberg | 264/45.1 |
| 4,481,160 | 11/1984 | Bree | 264/254 |
| 4,544,584 | 10/1985 | Ross et al. | 264/73 |
| 4,743,417 | 5/1988 | Bakkelunn | 264/45.1 |
| 5,047,187 | 9/1991 | Banus | 264/254 |
| 5,185,192 | 2/1993 | Banus | 264/254 |

*Primary Examiner*—Angela Ortiz
*Attorney, Agent, or Firm*—Gifford, Krass, Groh, Sprinkle, Patmore, Anderson & Citkowski, P.C.

[57] ABSTRACT

A mold process for producing a finished solid surfaced countertop in which a mold of the product to be produced is placed in a substantially horizontal manner. A series of barriers are constructed atop a flat polished surface of the mold and creates a negative shape of the countertop product to be produced. A release wax surface is applied over the exposed edges of the mold and is followed by the spraying a predetermined layer of a high-quality resin surface coating. The coating is allowed to gel to a point at which a plasticized substrate material is poured into the mold and over the resin surface coating. A catalyst is added to the substrate material prior to pouring and elevates the temperature of the substrate and the surface coating during the hardening and curing process. The surface coating bonds to the substrate and cures without the development of pinholes or other imperfections in the surface coating. Subsequent layers of substrate material may be poured to reach any desired thickness and then one or more backing portions are attached to the countertop to permit the countertop to be attached to a cabinet. The finished countertop is allowed to harden and cure within the mold for a given period of time and is then removed from the mold to cure for an additional period of time.

11 Claims, 3 Drawing Sheets

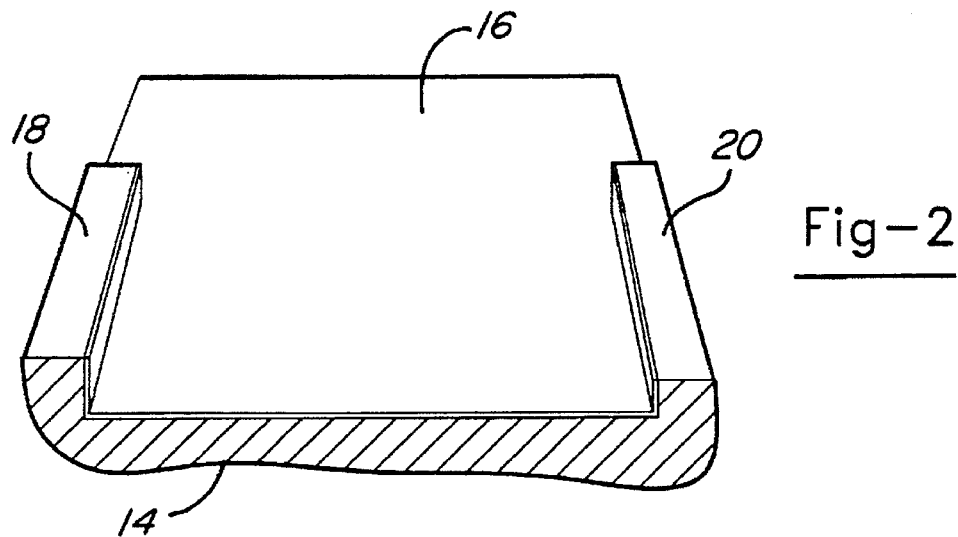
Fig-2
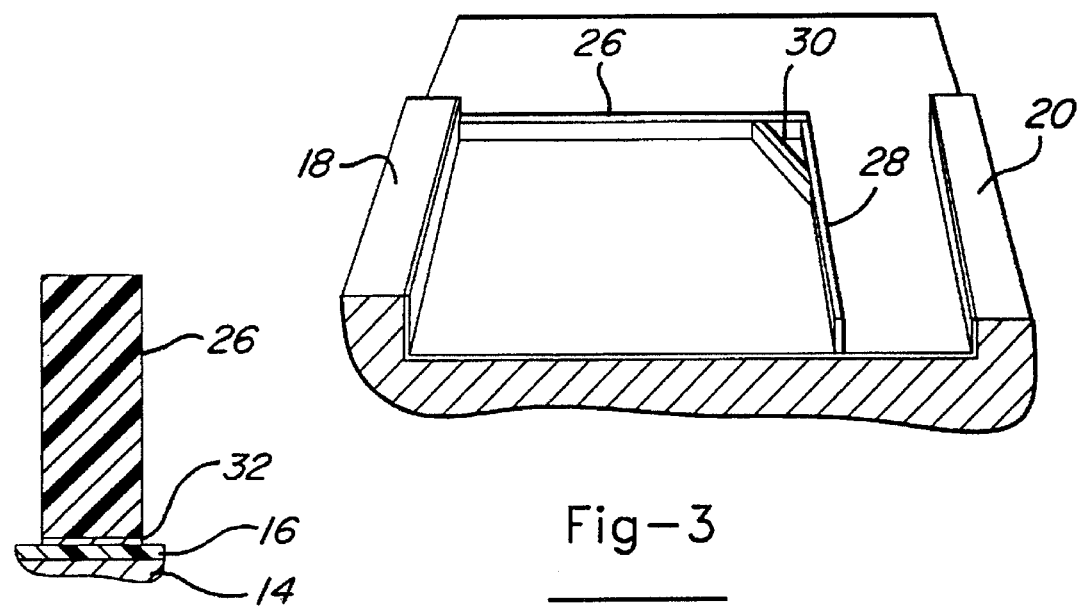
Fig-3
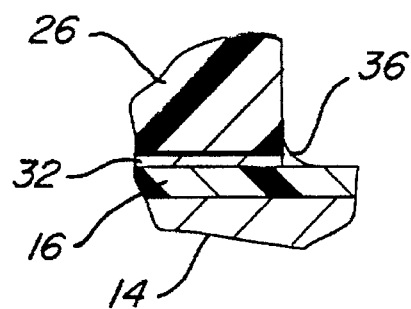
Fig-4
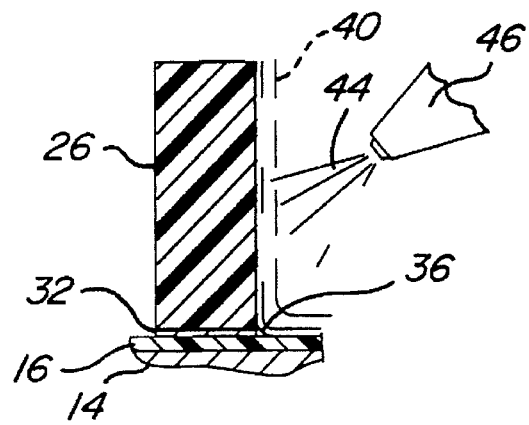
Fig-6
Fig-5

MOLD PROCESS FOR PRODUCING A FINISHED SOLID SURFACE COUNTERTOP

BACKGROUND OF THE INVENTION

1. Field of the Invention

The present invention relates generally to molded countertops for use particularly in kitchens and bathrooms and, more particularly, to a novel mold process for producing a finished solid surface countertop.

2. Description of the Prior Art

Various processes and procedures are known in the art for producing solid surface and cultured marble countertops. The term solid-surface pertains to a material where there is no painted or laminated skin or outer surface. With solid surface materials, small scratches and burns, etc. are sanded or buffed out.

The industry for solid surfacing began approximately twenty five years ago when Dupont Inc. developed a high quality surfacing material known commercially as Corian. Since the early 1980's, several major manufacturers have developed their own brand of solid surface products. For the most part, these products are expensive to produce and are distributed in nominal sized sheets that are fabricated by cutting the sheet into the desired countertop shape and re-bounding by adhesive or the like to a substrate surface.

More recently, spray-on solid surface materials, such as those commercially known as Safas and Granulon, have come into use. In one known application, these spray-on materials are coated over an inexpensive material, such as a particle board or other substrate which is already shaped in the desired fashion. Once the spray-on material has dried, a lengthy sanding and finishing process is required to bring the finish up to the desired quality and there still is a need to remove pinholes exposed during this process which are a by-product of spray-on coatings of this type. Such sanding and finishing processes are necessary for providing the necessary finish and are normally too labor intensive to be workable in today's production countertop industry.

SUMMARY OF THE PRESENT INVENTION

The present invention is a mold process for producing a finished solid surface countertop. A negative impression of a desired mold shape is constructed by positioning appropriately shaped barriers upon a flat polished surface, such as Formica or polished stainless steel, and securing them to the mold surface using an appropriate adhesive. A series of clay fillets are created along the inside edges of the mold and are shaped to provide a rounded upper edge contour to the finished mold product. A release wax coating is then applied over the area of the polished mold surface surrounded by the barriers to enable the countertop product subsequently formed to be easily removed from the mold once it has hardened and cured.

A high quality solid surface resin is then applied through a spray nozzle onto the waxed mold surface, including the walls of the outside barriers of the mold. The high quality resin material is allowed to cure up to a point at which the surface of the resin material gels. A substrate material consisting of a low quality resin is provided in a liquid form and is catalyzed by adding a liquid catalyst. The liquid is then poured into the mold and over the semi-cured resin spray. A by-product of the catalyst is the generation of low levels of heat which aid in the curing and hardening of the high quality resin spray and its bonding to the surface of the resin liquid.

Once the initial layer of substrate material has gelled, one or more dams are built onto the hardened surface and extend in an inwardly spaced manner at select positions around the periphery mold barrier. The dams are usually made up of teflon product or materials which are bonded to the hardened resin surface by an appropriate adhesive tape or caulk. An additional layer of material is then poured into the bounded area and is subsequently allowed to cure and dry in the same manner.

The finished countertop product is allowed to cure for a limited period of time within the mold and is then removed from the mold and allowed to cure for a longer period of time. Once the finished countertop product has been sufficiently hardened and cured, appropriate wood backings are attached to the substrate surface using an appropriate adhesive. The flashing which has accumulated around the edges is removed and the edges are quickly treated and sanded to a smooth finish.

BRIEF DESCRIPTION OF THE DRAWING

Reference will now be had to the attached drawing, when read in combination with the following specification, wherein like reference numerals refer to like parts throughout the several views, and in which:

FIG. 2 is a perspective view of the mold surface used in the mold process of the present invention;

FIG. 3 is a view similar to FIG. 2 and showing the placement of the barriers which define a negative of the desired shape formed within the mold;

FIG. 4 is a partial view in cross section of a barrier used in the mold shown in FIG. 3 and the adhesive means for securing it to the mold surface;

FIG. 5 is a view similar to FIG. 4 and showing the creation of a fillet along an edge between a barrier or wall of the mold and the flat mold surface;

FIG. 6 is a view similar to FIG. 4 and showing the application of the release wax coating and the subsequent spray application of the resin surface coating onto the prepared surfaces of the mold;

DESCRIPTION OF THE PREFERRED EMBODIMENT

Figure 1:
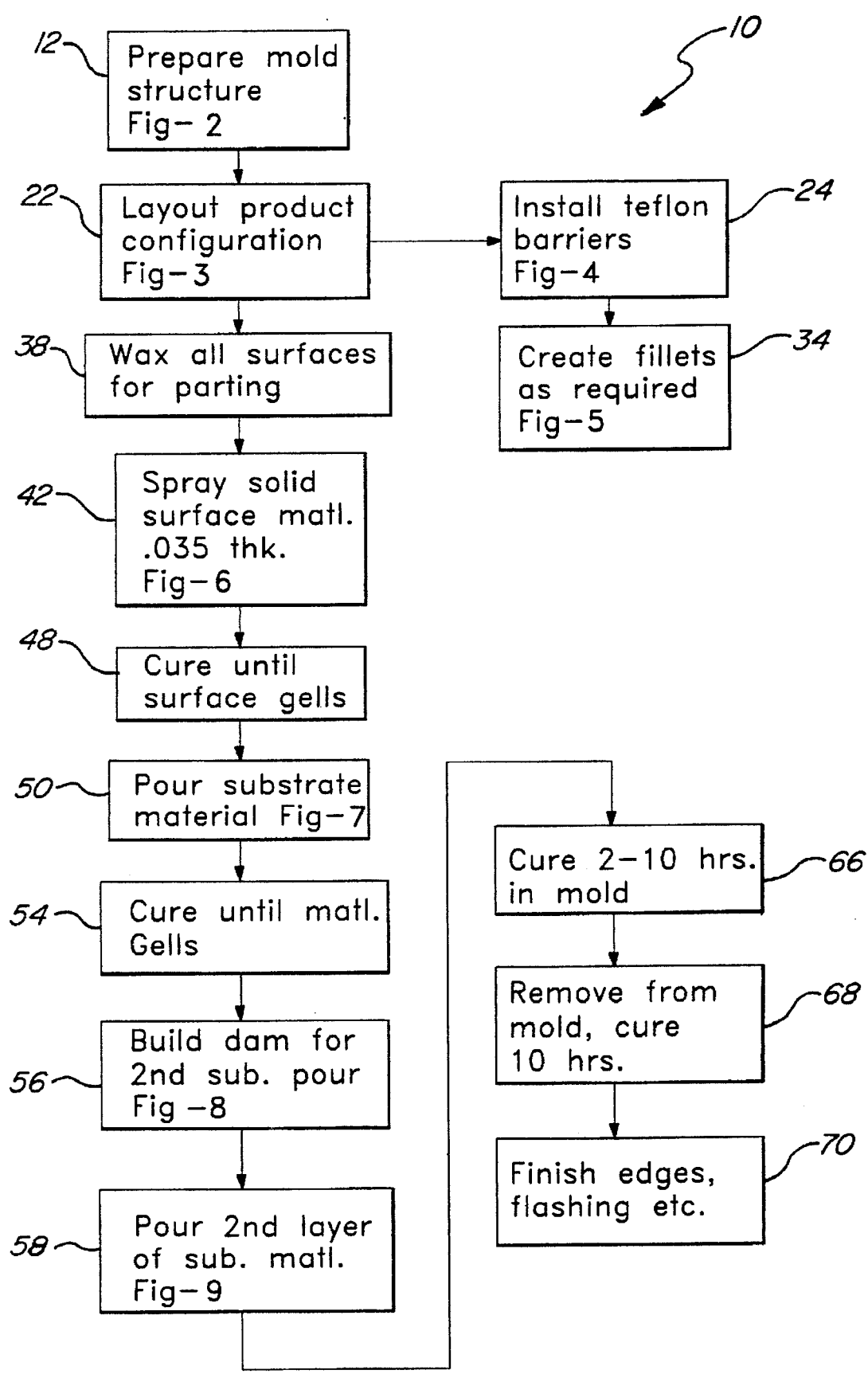
FIG. 1 is a block diagram of the mold process for creating a finished solid surface countertop according to the present invention.

Referring to the block diagram of FIG. 1 and FIGS. 2–9, a unique and novel mold process 10 for constructing a finished solid surface countertop is shown. Primarily, such countertops are produced for use in kitchens and bathrooms and their process of manufacturing is as follows.

At step 12, the mold structure is prepared for the process 10 of the present invention. Referring again to FIG. 2, the mold includes a body 14 having at least a flat polished surface 16 and is constructed either of Formica, stainless steel or other polished material to which these surfaces are bonded. The mold body 14 terminates in a pair of raised sides 18 and 20 along opposing edges of the mold, the raised sides assisting in setting up the desired mold enclosure.

At step 22, the configuration of the desired countertop product is assembled upon the mold. At step 24, the preparation of the mold enclosure includes the assembly of Teflon barriers onto the mold surface. Referring to FIG. 3, a series of barriers 26, 28 and 30 are constructed upon the surface of the mold and form a negative impression of the desired countertop surface to be produced. The barriers 26 and 28 form two sides of a generally rectangular shaped mold configuration and the barrier 30 forms an angle between the two sides. The sides and edges of the mold are also utilized in creating the desired mold enclosure as shown in FIG. 3. The barriers are preferably constructed of the Teflon material to provide a non-stick surface to the mold materials which subsequently applied, however the barriers can be constructed of any other material such as wood and the like which fulfills the required function.

Referring to FIG. 4, a given barrier such as barrier 26 is shown in side view mounted atop the surface. A durable adhesive such as a two-way tape layer 32 is provided for releasably securing the barrier 26 upon the mold surface. At step 34, and referring to FIG. 5, a plurality of fillets 36 are created around the edges between the mold surface 16 and the barriers, such as barrier 26. The fillets are preferably constructed of a moldable clay and are applied in a 0.25" (inches) round diameter roll form extending along the edges of the mold. The clay fillets are fitted into the exposed edges by an appropriately shaped tool having a spherical shaped head portion on the end of a metal rod. (not shown). The purpose of the fillets is to provide a rounded top edge to the desired upper surfaces of the countertop to be formed in the mold.

At step 38, and referring to FIG. 6, a release wax coating 40 is applied over all of the surfaces of the mold. The wax coating is of a conventional type known in the art and is capable of being applied by a rag or other type of applicator onto the exposed mold surface. The purpose of the wax coating is to provide a buffer between the Formica surface of the mold and the resinous material of the cultured countertop. In the absence of the wax coating the resinous material would tend to bond to the Formica surface of the mold and would inhibit the removal of the finished countertop from the mold.

At step 42 and referring again to FIG. 6, a high quality resin surface coating 44 is applied through a spray applicator 46 onto the waxed surfaces of the mold. The resin coating 44 is preferably a high grade polyester or acrylic resinous material such as is commercially known as Safas or Granulon. Preferably, a quantity of alumina trihydrate chips are mixed into the spray resin in order to provide attractive design and color characteristics to the coating. The resin coating 44 is preferably applied to a thickness of 0.035" (inches), however this range can easily vary plus or minus 0.010" (inches) as desired.

Figure 7:
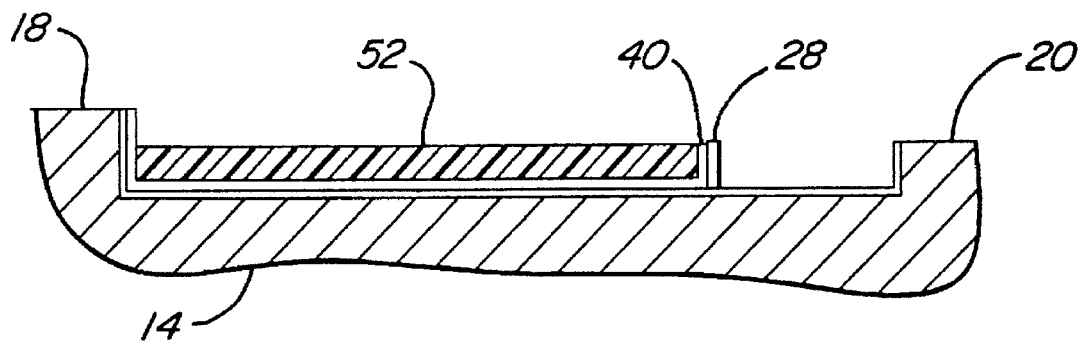
FIG. 7 is a side view of the mold of FIG. 3 and showing the application of a first layer of substrate material poured over the sprayed resin coating.

At step 48 the resinous coating 44 is left to set to a point at which the coating begins to gel. At this point, a substrate material is poured into the mold and over the resinous coating 44 (see step 50). Referring to FIG. 7, a low grade plasticized substrate material 52 is poured into the mold over the gelled high quality resin coating 44. The plasticized substrate material is preferably a low grade resin of a given mixture and is applied to a thickness of around 0.75" (inches).

A preferred recipe for the substrate material is made up of a 75% calcium carbonate (or Gypsum) content and a 25% ortho-resin or other low grade oil based resin material. A measured portion of polyester micro balloons are added to the mixture to lighten the mixture color and to provide insulating characteristics to the mixture. Also, short lengths of a high-tensile glass fiber can be added for strength or an unpromoted ortho-based resin can be added to provide flexibility and to retard cure time. Finally, a liquid catalyst such as a methyl ethyl ketone peroxide is added to initiate the hardening and curing of the substrate material prior to its pouring into the mold.

A side effect of the catalyst is the elevating of the substrate material temperature to approximately 120 degrees Fahrenheit to 130 degrees Fahrenheit. The heating of the mixture upon adding the catalyst also assists in the hardening and curing of the gelled resin coating 44 and the bonding of the coating 44 with the substrate layer 52.

Figure 8:
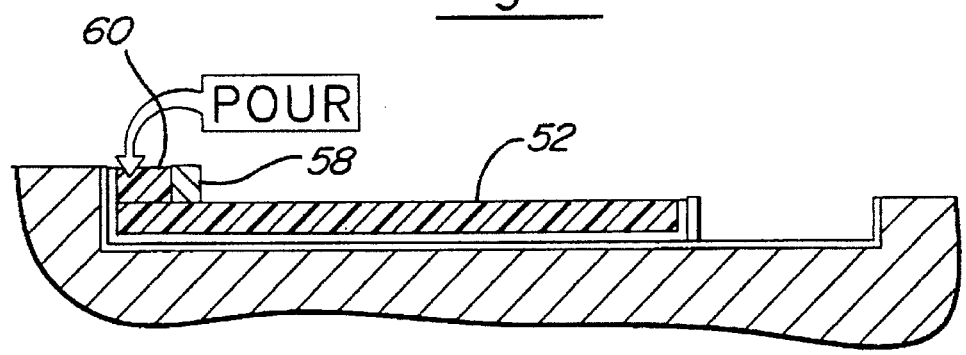
FIG. 8 is a view similar to FIG. 7 and showing the construction of a dam upon a gelled surface of the first layer of substrate material for the application of a second layer of substrate material.

At step 54, and referring to FIG. 8, the substrate material 52 begins to gel after a measured period of curing. At step 56, a dam is constructed prior to subsequent pouring of substrate material. Specifically, a rectangular shaped teflon backing or like material 58 is secured to the hardened surface of the substrate layer 52 by adhesives or other conventional fastening means as is known in the art. The installation of the backing 58 creates a dam between the backing and the sides of the mold. A second substrate layer 60 is poured into the dammed area, preferably again in a thickness range of approximately 0.75" (inches).

Figure 9:
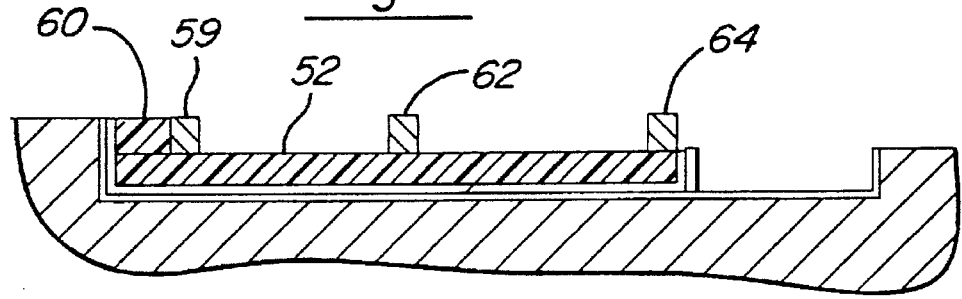
FIG. 9 is a view similar to FIG. 8 and showing a finished countertop in the mold with substrate backing portions in place.

Referring to FIG. 9, the teflon backing 58 is removed and replaced with a wood backing 59, applied by a bonding adhesive. Additional wood backings 62 and 64 may also be attached to the cured surface of the substrate material 52 and permit the finished countertop to be attached atop a cabinet (not shown).

The finished countertop can have any desired thickness, but is preferably at least approximately 0.75" (inches) at its narrowest point and is 1.50" (inches) nominal thickness around its edge. Additional layers of substrate material can be added to produce a countertop having any desired thickness. At step 66, the countertop is allowed to cure in the mold for a period of between 2 and 10 hours and at step 68 is removed from the mold and allowed to cure for an additional 10 hours. At step 70, once the countertop has completely dried and cured, flashing which forms during the molding process is removed and the edges are finished by sanding.

The present invention therefore provides a unique and novel process for creating a molded countertop article having a high quality surface finish and which does not require any sanding of the spray coat finish in order to remove pinholes and other imperfections which result from known conventional methods for producing such countertops. The formation of the solid surface countertop within the mold prevents the formation of pinholes in the coating surface which would otherwise have to be sanded or buffed out.

Figure 10:
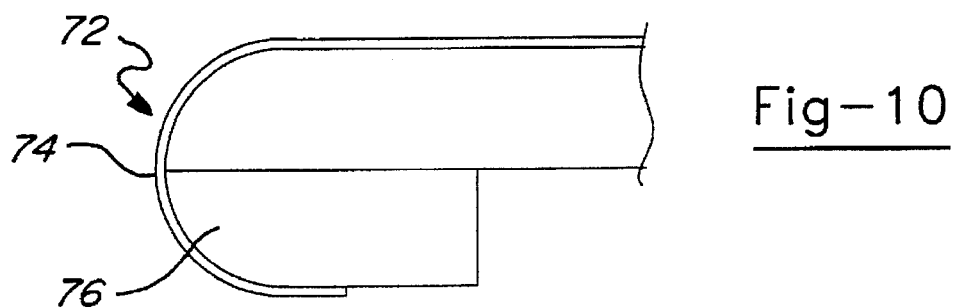
FIG. 10 shows the application of a high quality resin spray surface coating onto a substrate material according to another preferred embodiment of the present invention.

Referring to FIG. 10, a molded countertop 72 according to a further preferred embodiment of the present invention is shown. The countertop 72 has a resin spray coat 74 applied onto a substrate material 76. The substrate material 76 according to this embodiment can be constructed of wood, fiberglass, particle board or any other desired material and the spray coat 74 is applied evenly across the surface of the substrate material 76. The substrate material can be heated if desired to assist in the curing of the applied surface coating 74 and to help prevent the formation of pinholes and other surface imperfections. The substrate material can further be placed in within a like-shaped mold for bonding to the surface coating and for hardening and curing.

Having described my invention, additional embodiments will become apparent to those skilled in the art to which it pertains without deviating from the scope of the appended claims.

I claim:

1. A mold process for producing a finished solid surface countertop, said mold process comprising the steps of:

placing in a level position a mold;

creating atop said mold an enclosure having a negative shape of a countertop part to be produced, said enclosure including a top surface and elevated side surfaces;

said step of creating said negative shape of said mold further comprising the step of constructing a plurality of barriers onto a flat polished surface of said mold;

spraying a continuous layer of a high quality resin coating material evenly across said top and side surfaces of said negative shape enclosure;

allowing said resin coating material to set and to gel for a predetermined period of time to form a gelled resin coating;

pouring a layer of a substrate material in a liquid state into said mold and over said gelled resin coating to form a substrate layer, said substrate layer including a catalyst which increases a temperature of said substrate layer and facilitates hardening;

building a dam atop a gelled surface of said substrate layer for receiving a subsequent layer of substrate material atop said gelled surface of said substrate layer to produce a built-up edge;

cooling and hardening said layers of substrate material causing said continuous layer of a high quality resin coating material to cure and harden and to bond to said substrate layer; and removing the finished countertop from within the mold.

2. The mold process for producing a finished countertop as described in claim 1, further comprising the step of mixing a liquid recipe for a low-grade plasticized material comprising said substrate layer, said material utilizing one part oil based resin and three parts calcium carbonate.

3. The mold process for producing a finished countertop as described in claim 2, further comprising the step of adding a methyl ethyl ketone peroxide liquid catalyst to said liquid recipe prior to pouring said liquid recipe into said mold.

4. The mold process for producing a finished countertop as described in claim 3, further comprising the step of elevating the temperature of said liquid recipe to a range of between 120° F. and 130° F. prior to said steps of hardening and curing.

5. The mold process for producing a finished countertop as described in claim 3, further comprising the step of adding polyester microballoons to said liquid recipe.

6. The mold process for producing a finished countertop as described in claim 1, further comprising the step of mixing an alumina trihydrate into said high-quality resin coating material.

7. The mold process for producing a finished countertop as described in claim 1, further comprising the step of applying a two-sided adhesive between a base of each of said barriers and said flat polished surface of said mold.

8. The mold process for producing a finished countertop as described in claim 7, further comprising the step of applying a release wax coating onto said exposed surfaces of said mold polished surface and said barriers.

9. The mold process for producing a finished countertop as described in claim 1, further comprising the step of curing and hardening said countertop within said mold for a period of between two hours to ten hours.

10. The mold process for producing a finished countertop as described in claim 9, further comprising the step of removing a semi-cured countertop from said mold and permitting said countertop to cure and harden for an additional ten hours.

11. The mold process for producing a finished countertop as described in claim 10, further comprising the step of removing an accumulation of flashing from around edges of said countertop and finishing said edges.

* * * * *

UNITED STATES PATENT AND TRADEMARK OFFICE
CERTIFICATE OF CORRECTION

PATENT NO. :    5,628,949
DATED      :    May 13, 1997
INVENTOR(S) :   Robert Bordener It is certified that error appears in the above-indentified patent and that said Letters Patent is hereby corrected as shown below:

Column 5, line 16, delete "of said mold";

Signed and Sealed this

Twenty-first Day of October 1997

*Attest:*

BRUCE LEHMAN

*Attesting Officer*      Commissioner of Patents and Trademarks